United States Patent
Sakada

(10) Patent No.: US 9,395,987 B2
(45) Date of Patent: Jul. 19, 2016

(54) METHOD AND DEVICE FOR DETECTING A RACE CONDITION

(75) Inventor: Oleksandr Sakada, Munich (DE)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 194 days.

(21) Appl. No.: 13/824,965

(22) PCT Filed: Sep. 23, 2010

(86) PCT No.: PCT/IB2010/054296
§ 371 (c)(1),
(2), (4) Date: Mar. 18, 2013

(87) PCT Pub. No.: WO2012/038780
PCT Pub. Date: Mar. 29, 2012

(65) Prior Publication Data
US 2013/0185524 A1    Jul. 18, 2013

(51) Int. Cl.
G06F 9/30 (2006.01)
G06F 11/07 (2006.01)
G06F 11/36 (2006.01)

(52) U.S. Cl.
CPC .......... *G06F 9/3009* (2013.01); *G06F 11/0715* (2013.01); *G06F 11/0751* (2013.01); *G06F 11/362* (2013.01)

(58) Field of Classification Search
CPC . G06F 9/3009; G06F 11/362; G06F 11/0715; G06F 11/0751; G06F 9/30094
See application file for complete search history.

(56) References Cited

U.S. PATENT DOCUMENTS

| | | | |
|---|---|---|---|
| 6,009,269 A * | 12/1999 | Burrows et al. | 717/130 |
| 6,108,754 A * | 8/2000 | Lindholm | 711/122 |
| 6,851,075 B2 | 2/2005 | Ur et al. | |
| 6,920,634 B1 * | 7/2005 | Tudor | 718/107 |
| 7,243,319 B2 | 7/2007 | Ouyang | |
| 7,366,956 B2 | 4/2008 | Karp et al. | |
| 7,366,965 B2 | 4/2008 | Yamasaki et al. | |
| 7,549,150 B2 | 6/2009 | Yu | |
| 7,757,237 B2 | 7/2010 | Karp et al. | |
| 7,818,723 B2 | 10/2010 | AliKacem et al. | |
| 7,949,837 B2 * | 5/2011 | Holt | 711/150 |
| 8,185,874 B2 | 5/2012 | Ball et al. | |
| 2005/0038806 A1 * | 2/2005 | Ma | 707/102 |
| 2005/0216798 A1 * | 9/2005 | Yu | 714/718 |
| 2005/0283781 A1 * | 12/2005 | Karp et al. | 718/100 |
| 2007/0245312 A1 | 10/2007 | Qadeer et al. | |
| 2008/0120627 A1 * | 5/2008 | Krauss | 719/328 |
| 2009/0094431 A1 * | 4/2009 | Sarkar et al. | 711/163 |
| 2009/0282288 A1 | 11/2009 | Wang et al. | |
| 2009/0328019 A1 | 12/2009 | Detlefs et al. | |

OTHER PUBLICATIONS

International Search Report and Written Opinion correlating to PCT/IB2010/054296 dated Apr. 7, 2011.

\* cited by examiner

*Primary Examiner* — Kevin Verbrugge
*Assistant Examiner* — Francisco Grullon

(57) ABSTRACT

A method for detecting a race condition, comprising storing a seed value to a first global variable D; detecting a race condition when the second global variable A does not equal a first predefined value V1, wherein the second global variable A was set to the first predefined value V1 at the initiation event prior to storing the seed value; storing a second predefined value V2 to the second global variable A; detecting a race condition when the first global variable D does not equal the seed value; accessing a shared resource; and storing the first predefined variable V1 to the second global variable A.

13 Claims, 4 Drawing Sheets

METHOD AND DEVICE FOR DETECTING A RACE CONDITION

FIELD OF THE INVENTION

This invention relates to a method and a device for detecting a race condition and a computer program product.

BACKGROUND OF THE INVENTION

Modern processing devices for executing software code often support multithreaded approaches, in which a single program is split into at least two separate threads that are executed independently. It is also possible that the processing device comprises more than one processing units, each unit having one or more cores for executing code. In this case, the separate threads can be independently executed in the same time period on different cores. During execution, it is possible that one thread tries to access a shared resource, e. g. a shared memory or an I/O-device, which is already accessed by another thread. This situation is called a data race or race condition and results when a shared resource is accessed by two or more concurrent threads without proper synchronisation to constrain the ordering of the accesses, and at least one of the accesses is a write operation. This means that the results of the threads may vary depending on the access sequence. Such behaviour is normally unwanted, and in order to avoid race conditions, many processing devices support synchronization primitives such as semaphores in their hardware. The implementation of synchronization primitives is usually available within an Operating System or dedicated libraries and is supported by dedicated hardware mechanisms. For example, U.S. Pat. No. 7,757,237 B2 describes the synchronization of threads in a multithreaded computer program using a dedicated hardware table that is updated with addresses of shared variables upon execution of load/store instructions. EP 1 591 895 A2 describes a method based on maintaining a virtual clock by each thread and thread segments. A method based on the comparison of the variable content with a local copy is shown in U.S. Pat. No. 7,366,965 B2, and a method using a compiler configured to generate code with a software transactional memory system is known from US 20090328019 A1. U.S. Pat. No. 7,549,150 B2 extends a classic hardware-based lockset approach for reporting fewer false positives in the fork and join context.

In addition to the dynamic approach described above, there are also other approaches to prevent a race condition at missiontime or runtime. U.S. Pat. No. 7,243,319 B2 uses a static analysis of hardware circuits to detect race conditions. The detection of race conditions using a test suite during software testing phase is known from U.S. Pat. No. 6,851,075 B2, and US 20080109641 A1 describes a method for defining a set of tests which can be used for testing the program in the software testing phase. A method for detection of code deficiencies, such as potential race conditions, is given in US 20060053422 A1.

SUMMARY OF THE INVENTION

The present invention provides a method and a device for detecting race condition and a storage medium storing detecting code as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part be implemented using computer systems and software known to those skilled in the art, details will not be explained in any greater extent than that considered necessary as illustrated above, for the understanding and appreciation of the underlying concepts of the present invention and in order not to obfuscate or distract from the teachings of the present invention.

In the context of this specification, a thread may be a sequence of instructions that may execute in parallel with other threads. A thread may be a part of a computer program.

A shared resource may be a resource that can be accessed by different threads, for example a memory location or an I/O-device.

A race condition may be when a function is invoked simultaneously from different cores, causing a function to act in such a way that corrupts the accessed shared resource. It may be, for example, a state during the execution of a program when two or more different threads concurrently access a shared resource, for example a memory location, without synchronisation. At least one of these accesses may comprise storing/writing to the memory location. A value or content of an accessed memory location and a result based on this value or content may depend on an access sequence for the different threads, but, without synchronisation, this access sequence may vary if the situation is repeated.

A global variable is a variable that is visible and accessible from every scope, for example, different routines, procedures, functions, subroutines or modules, in a computer program.

A Boolean may be a variable with a logical value, for example, true or false.

An initiation event may be the start of the execution of a computer program, for example, an init or reset state.

A predefined value may be a value that is constant during execution of a computer program and initialized once at the beginning of the execution.

A seed value may be a value that is unique and could be used for identifying a specific thread.

Storing may be the writing of a value to a memory location, wherein the memory location can be of any granularity, for example byte, half-word, or word.

A byte, a half-word, and a word may be a memory location of a specific size.

A shared resource may be a resource that is used by different threads simultaneously. A resource may be a memory location or an external device.

Accessing a resource may be the storing of data to the resource or the loading of data from the resource. The storing of data could be described as writing of data, and the loading of data could be described as reading of data. The resource may be a memory location, a DMA (direct memory access) channel, GPIO (general purpose input output), or a Flex-Ray network.

Terminating may be the return to a calling thread which might be interrupted.

Figure 1:
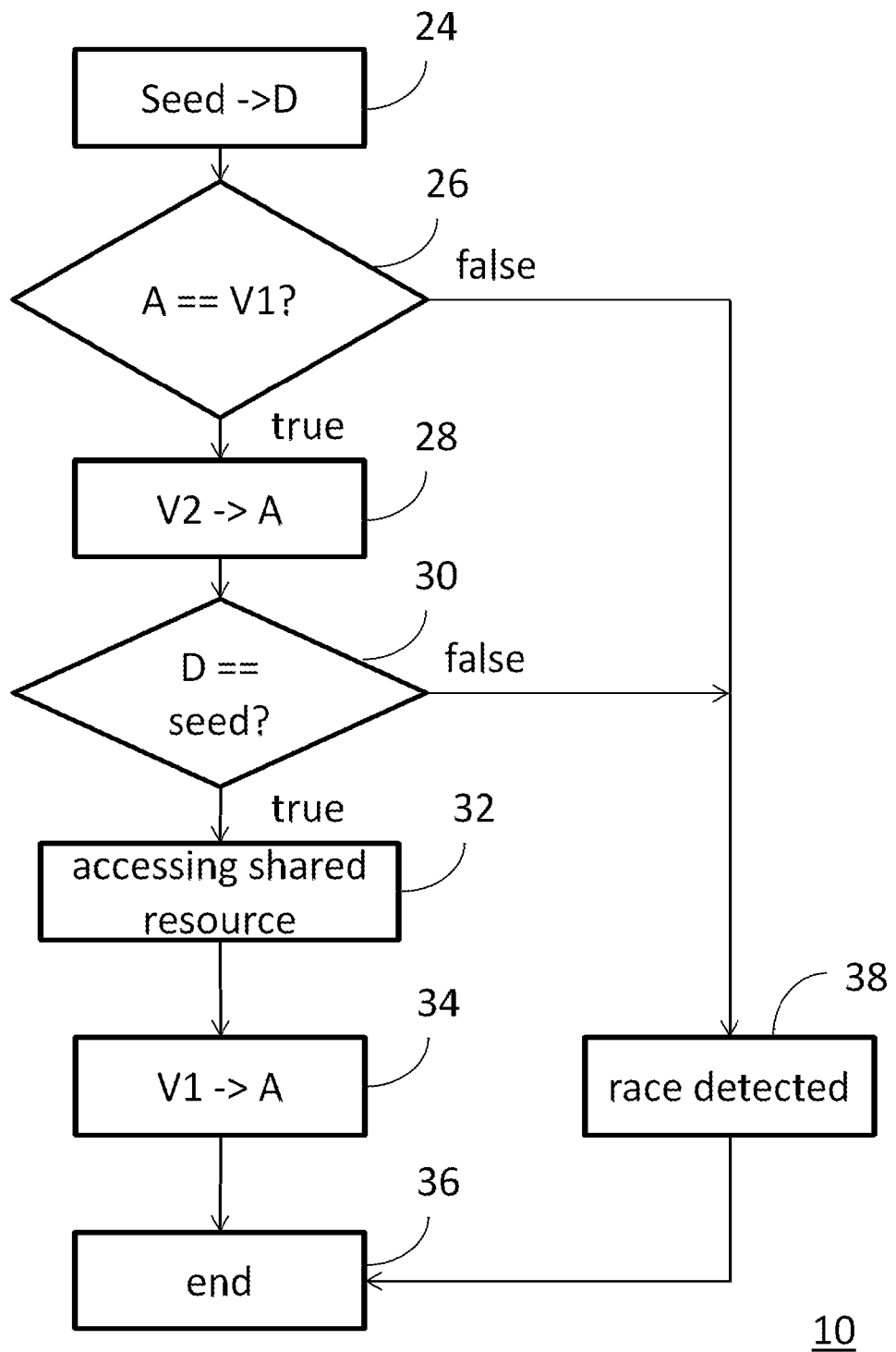
FIG. 1 schematically shows a flow chart of an embodiment of a method for detecting race conditions.

Now referring to FIG. 1, a flow chart of an embodiment of a method for detecting race conditions is schematically shown. Reference numeral 10 refers to a method that may be provided as a code portion of an executable computer program. At an initiation event, an executable computer program that is not shown here may provide a first global variable D and a second global variable A that may be initialized with a predefined value V1. The method 10 according to FIG. 1 may be called by a thread as part of a computer program, wherein said thread may want to access a shared resource, for example, a shared memory location, a bus system or an I/O-device. When calling the method 10, the thread may provide a seed value that may be unique and suitable for distinguishing different threads. The provided seed value may be stored or written to the first global variable D in step 24. It may be possible to generate a unique seed value within the method 10 which could also be used for the same purposes. This may be realised, for example, based on a random number generator. The following step 26 may be used to compare the second global variable A with a first predefined value V1. For execution of the comparison, the value of the first global variable D may be loaded or read and compared with the first predefined value V1 that may already be available for the method 10. The result of this comparison may be a Boolean having the value true or false. The value of the Boolean may, for example, be used for deciding which branch of the flowchart is to be executed. The second predefined value V2 may be stored or written to the second global variable A in step 28 when the value of the Boolean is true. From this time on, any other thread calling the method 10 to access the shared resource may be able to detect a race condition. This will be described in detail in connection with FIG. 2. In step 30, the value of the first global variable D may be compared with the seed value. Again, the resulting Boolean may be used to decide which branch of the flowchart is executed. This comparison may be used for detecting whether any other thread has called the method 10 since the seed value has been stored to the first global variable D. This will be described in detail in connection with FIG. 3. When the Boolean is true, the shared resource may be accessed safely in step 32. In step 34, the first predefined value V1 may be stored to the second global variable A. This may restore the second global variable A to its initial value. Reaching step 34 may be used as an indicator to the application that a corresponding hardware solution dispatching accesses to the shared resource works error free of faultless. It may also be used as an indicator for other threads calling the method 10 in order to decide whether the shared resource can be accessed safely. The method 10 may terminate in step 36 with the return to the calling thread. The other branch of the flowchart may be executed, and step 38 may be invoked when the Boolean as result of the comparison in step 26 or the Boolean as result of the comparison in step 30 is false. Invoking step 38 may be the result of a potential race condition, and the method 10 may terminate in step 36 after invoking step 38 without accessing the shared resource, because another thread may access the shared resource during the same period of time. In step 38, the race condition may be identified by the value of the Boolean, the value being false.

Reaching step 38 may be used as an indicator to the application that an error is detected in the work of a corresponding hardware solution dispatching accesses to the shared resource. The device executing method 10 comprising the shared resource, for example, a memory location or a device, may not be considered safe anymore, and switching it off or resetting it may be more important than accessing a shared resource. In step 38, it may be possible to generate a race detected message to handle the error/fault directly within the method 10, as described later.

The method 10 for detecting a race condition comprises the following steps: storing a seed value to a first global variable D, identifying a race condition when a second global variable A does not equal a first predefined value V1, wherein the second global variable A was initially set to the first predefined value V1 at the initiation event, storing a second predefined value V2 to the second global variable A, identifying a race condition when the first global variable D does not equal the seed value, accessing a shared resource, and storing the first predefined variable V1 to the second global variable A.

The method 10 may be completely executed in software, and it may not be necessary to have dedicated hardware support for detecting/avoiding race conditions, for example, by synchronisation with hardware primitives as semaphores when using the method 10. The method 10 may allow the detection of a race condition in situations where a dedicated hardware support for avoiding race conditions may not work correctly due to a hardware defect/fault, and it may be used as an independent second safety level to check whether the hardware solution (the first safety level) for avoiding race conditions is working correctly. It may be implemented in addition to hardware primitives to check at runtime whether the hardware primitives work correctly. This possibility results from the property of a hardware solution for avoiding race conditions, as a race condition does not occur as long as the hardware solution works correctly. The hardware solution, for example, semaphores, may decide whether a shared resource can be accessed safely. It may dispatch the accesses to the shared resource, making the access safe. When the hardware solution works correctly, it may lock an execution of a second thread accessing a "busy" shared resource or may "kindly ask" to wait until the shared resource is free again and a race condition will not occur. For example, the method 10 may only detect a race condition when the hardware solution shows a fault, and the corresponding hardware primitive or synchronisation primitive may work incorrectly. Other hardware primitives may also work incorrectly due to the same reasons, and the device executing method 10 comprising the shared resource may be switched-off or reset. Accessing the shared resource may invoke a first safety level approach for preventing race conditions, as it is known in the art, when the method 10 checks this approach.

The method 10 may also be used with any solution for preventing race conditions which works as a first safety level, for example, semaphores implemented partially in hardware and partially in software or implemented fully in software. Any solution used together with the method 10 as a first safety level solution may be implemented in hardware, partially in hardware and partially in software, or fully in software. It may be normal to detect race conditions for all solutions working as a first safety level because they solve detected race conditions, for example, by synchronisation of accesses on runtime. Detecting a race condition with the method 10 as a second safety level may be an exceptional event, because of a fault/error in the first safety level.

The method may be based on a property of memory controllers to sequentially perform accesses to a memory location which are initiated simultaneously from different cores. The method 10 may be used with memory locations of any granularity, for example byte half-word, or word, for the global variables. A memory controller which performs non-sequential accesses to a memory location may, nevertheless, be used. When the method does not detect a race condition, the method may perform three write memory accesses, two read memory accesses for loading the global variables for the comparisons and two comparisons. The method 10 may not lead to any limitations on concurrent execution of different threads. Different threads may be asynchronously executed on different cores with different speeds and also with enabled interrupts. The method 10 may, for example, apply to multitasking applications running on devices with a single core processing unit or a multi core processing unit.

It may be possible to generate a race detected message in step 38. The generated message may be used to inform the program about the faulty/defective behaviour in order to avoid further propagation of the fault/defect. The message may lead to a disabling of the shared resource due to a hardware fault, for example, in the synchronisation primitives or in the software code. Such a race detected message may be sent to the calling thread and/or any other appropriate receiver, for example, another thread accessing the shared resource. The other thread accessing the shared resource may be identified using the unique seed value that may, for example, be provided by the thread calling the method. The message may be sent directly after its generation or when terminating the method 10 in step 36. It may also be used for an exception handling process. This may be useful when the method 10 is used as a wrapper for controlling the access to the shared resource, for example, a global variable or a buffer. This may provide an interface, for example, a functional API (application program interface) for accessing the shared resource and performing checks against race conditions when accessing this shared resource. A simple exception handling strategy may be to let the thread that was not allowed to access the shared resource call the method again after detecting a race condition. When the other thread that initially interfered with the thread has finished the access to the shared resource, the thread which was initially not allowed may now be able to access the shared resource. The method 10 may generate a race detected message and/or terminate when a race condition is identified. It may be possible to handle the error/fault directly by invoking a call-back function, for example, for switching-off or resetting the device executing method 10 comprising the shared resource, or by executing a set of predefined commands. The predefined commands may invoke similar actions such as invoking a call-back function, switching-off or resetting the device executing the method 10 comprising the shared resource or sending a race detected message. It may not be necessary to return to a calling task when a race condition is detected.

It may be possible to use the method 10 with different shared resources, wherein different instances of the method 10 may be generated, namely one instance for each shared resource. In this case, each instance may have its own global variables.

Figure 2:
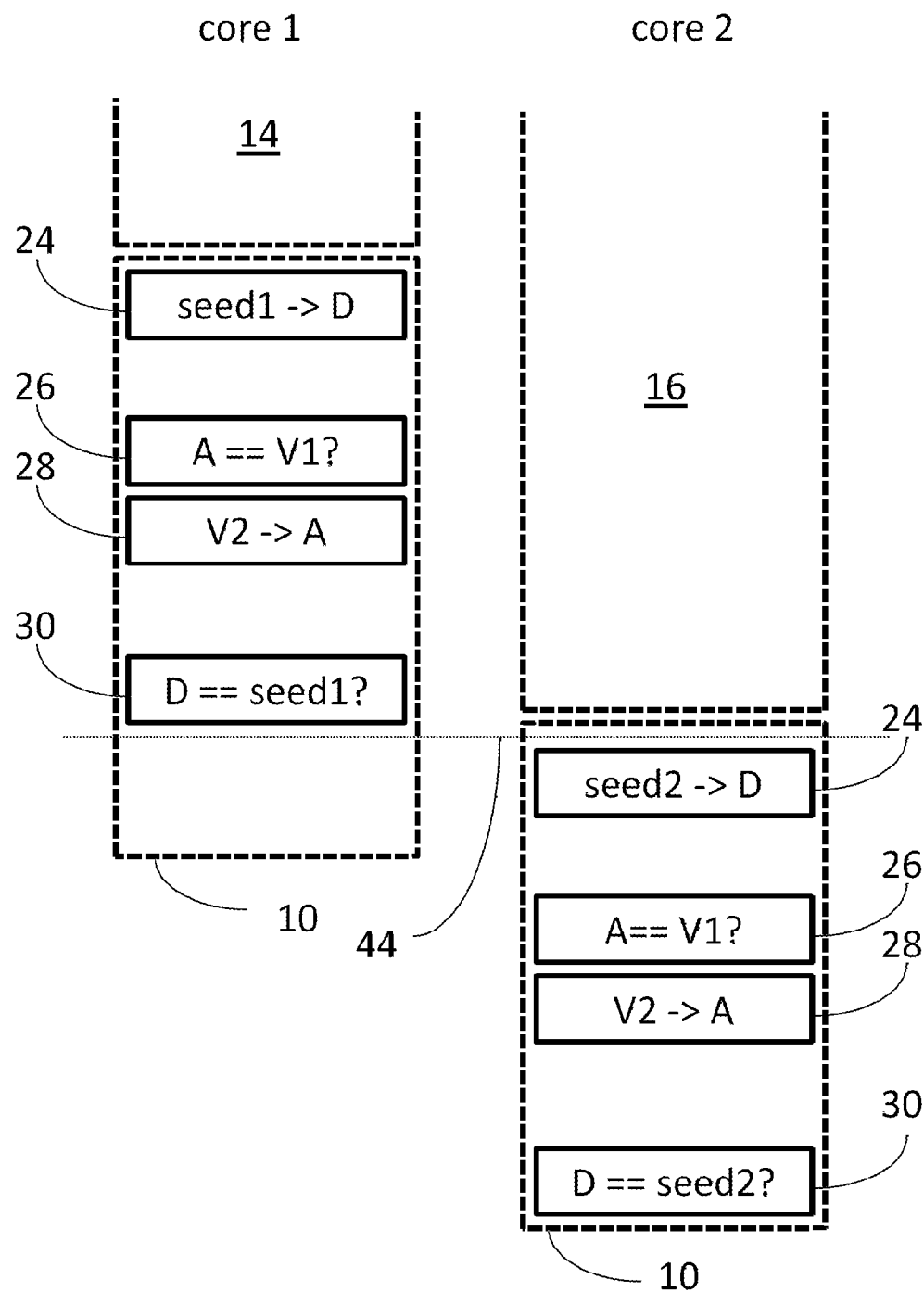
FIG. 2 shows a first example of a working principle of an embodiment of a method for detecting race conditions.

FIG. 2 shows a first example of a working principle of an embodiment of a method for detecting race conditions. The left side of FIG. 2 shows a part of an execution pipeline of a first core 1 and the right side of FIG. 2 shows a part of an execution pipeline of a second core 2. The first core 1 and the second core 2 may be part of a single processing unit or part of different processing units. A first operation on the left side and a second operation on the right side that are illustrated on the same height may be executed simultaneously by the first core 1 and the second core 2. The first core 1 may execute a first thread 14 while the second core 2 may execute a second thread 16. When the first thread 14 accesses a shared resource, it may call the method 10, and its own execution may be interrupted. The method 10 may correspond to the embodiment as shown in FIG. 1 and may, for example, comprise the steps 24, 26, 28, and 30, as described in connection with FIG. 1. In step 24, a seed value seed1 that may be provided by the thread 14 may be stored to the first global variable D. In step 26, the value of the second global variable A may be compared with the first predefined value V1. In step 28, the second predefined value V2 may be stored to the second global variable A, and in step 30, the value of the first global variable D may be compared with the provided seed value seed1. As shown in FIG. 1, the shared resource may be accessed when both results of the comparisons shown in steps 26 and 30 are true. Accessing the shared resource may be part of the method 10. The steps for accessing the shared resource (which are not shown for reasons of clarity) may follow step 30 after a time 44, the time 44 being represented by a horizontal line.

During execution of the method 10 by the first core 1, the second core 2 may simultaneously execute the thread 16. The second thread 16 may call the method 10 for access to the shared resource at the time 44. The second thread 16 may be interrupted, and the method 10 executed by the second core 2 may correspond to the method 10 as executed by the first core 1 comprising steps 24, 26, 28, and 30. The second thread 16 may provide a seed value seed2 that may differ from the seed value seed1. In step 26, the method 10 as executed by second core 2 may compare the value of the second global variable A with the first predefined value V1. The result of this comparison may be false since the method 10 as executed by first core 1 may have stored the second predefined value V2 to the second global variable A at an earlier time. According to the method 10 as illustrated in FIG. 1, the method 10 as executed by second core 2 may detect a race condition, may skip steps 28 and 30 and may skip accessing the shared resource in step 32 due to the detected race condition. A first thread 14 and a second thread 16 may call the method 10 when accessing the shared resource, and the seed value may be provided by the calling thread 14, 16. This approach may be used as a second safety level for independently checking another solution for preventing race conditions. The independent second safety level detects the fault/error by detecting a race condition when the other solution representing a first safety level fails, i. e., shows a fault/error.

Figure 3:
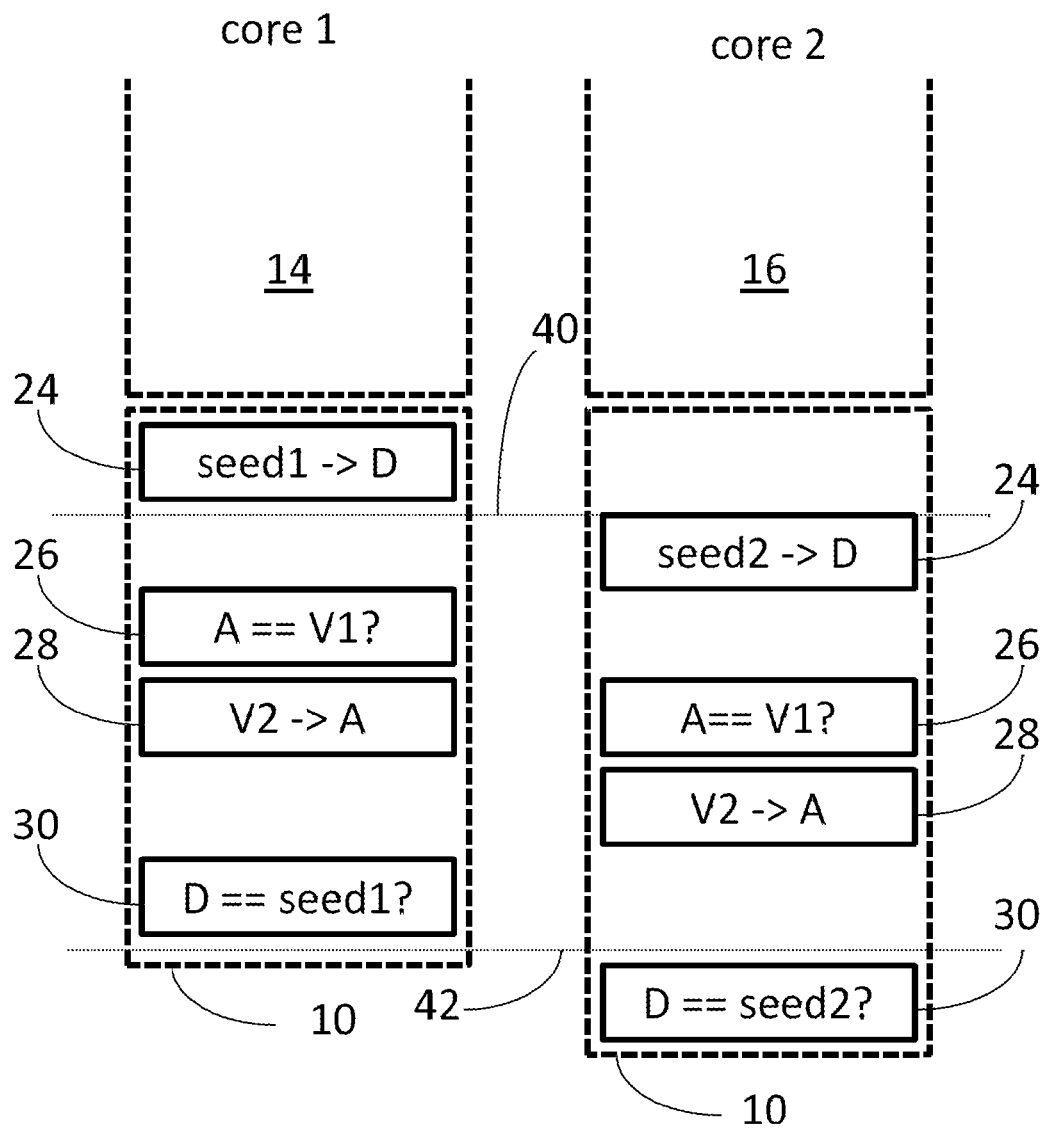
FIG. 3 shows a second example of a working principle of an embodiment of a method for detecting race conditions.

FIG. 3 shows a second example of a working principle of an embodiment of a method for detecting race conditions. FIG. 3 shows the same components as FIG. 2 but with different timing for the execution of the method 10. The method as executed by first core 1 may have finished step 24 at a time 40 while, at the same time 40, the method as executed by second core 2 may start executing step 24. This might be the case even if both cores start the method 10 at the same time. At the time 42, the method 10 as executed by first core 1 may have executed step 30, and the result of the comparison may be false since step 24 as executed by second core 2 may have changed the first global variable D to the seed value seed2. The method 10 as executed by first core 1 may detect a race condition and may skip accessing the shared resource. The method 10 as executed by first core 1 may detect that another thread called the method 10 after the seed value seed1 was initially stored to the first global variable D by detecting that the value of the first global variable D was changed again by another instance before accessing the shared resource. In this case, it may be possible that the other thread already accessed the shared resource, and as a result, accessing the shared resource by the method 10 as executed by first core 1 may corrupt the shared resource.

Figure 4:
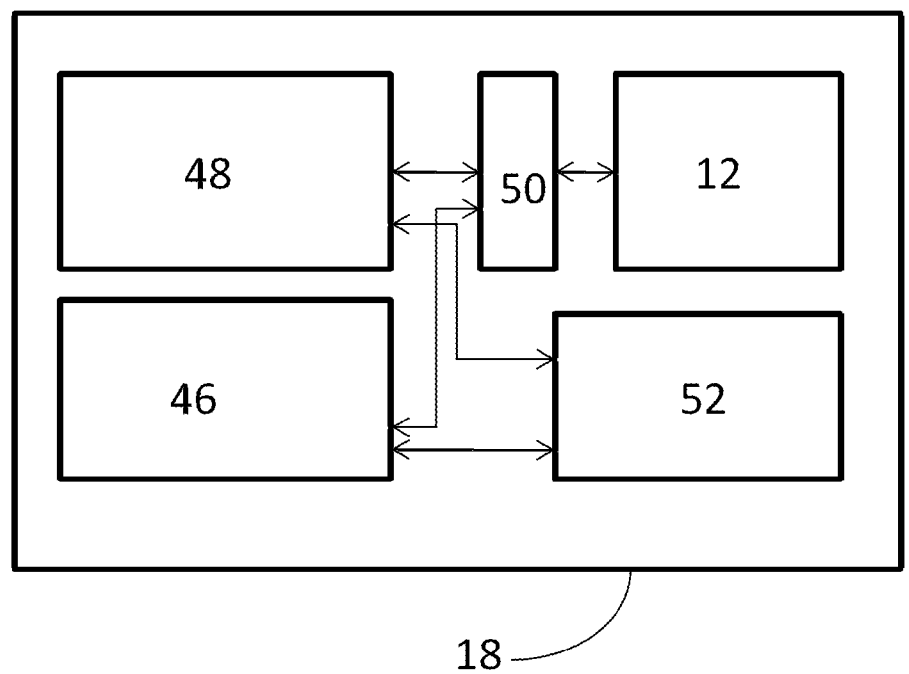
FIG. 4 schematically shows an example of a device arranged to detect race conditions.

FIG. 4 schematically shows an example of a device arranged to execute a method for detecting race conditions. The device 18 may be arranged to execute an embodiment of the method 10 as illustrated, for example, in FIG. 1. The device 18 may comprise a first processing unit 46, such as a microprocessor or a MCU (microcontroller unit) comprising a first core 1, and a second processing unit 48, for example, another microprocessor or another MCU comprising a second core 2. The first processing unit 46 and the second processing unit 48 may indirectly access a shared resource 12, for example, a shared memory location via a memory controller 50. The processing units 46, 48 may also directly access a further shared resource 52, for example a DMA channel or an I/O-device. The shared resource 12, the further shared resource 52, and the memory controller 50 may be part of the device 18. The memory controller 50 may always perform accesses to memory locations in the shared resource 12 sequentially or non-sequentially (i.e. simultaneously, which may be a worst-case scenario causing data interference). The memory controller may execute the accesses one after another, i.e. chronologically orders the accesses, when the first processing unit 46 and the second processing unit 48 try to access the same memory location, for example, the first global variable D, in the shared resource 12 during the same period of time.

The device 18 may be for detecting a race condition, wherein said device 18 comprises a processing unit 46, 48 arranged to store a seed value to a first global variable D, identify a race condition when a second global variable A does not equal a first predefined value V1, wherein the second global variable A was initially set to the first predefined value V1 at the initiation event, store a second predefined value V2 to the second global variable A, identify a race condition when the first global variable D does not equal the seed value, access a shared resource 12, and store the first predefined value V1 to the second global variable A.

The processing unit 46, 48 may be arranged to generate a race detected message and/or terminate when a race condition is identified.

The processing unit 46, 48 may be arranged to receive the seed value by a calling thread 14, 16.

A safety critical system may comprise a device 18.

A computer-readable storage medium may store code representing the device 18 and/or code to perform the method 10.

A computer program product may comprise code portions for executing steps of a method 10 or for implementing parts of a device 18 when run on a programmable apparatus.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the method may be implemented in a computer program as a function, a subroutine, and a module and the device may be part of or integrated in an embedded system, a computer system or a safety critical system using processing units.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, processing units, memory controller and memory location comprising global variables may be located on the same die. Alternatively, the examples may be implemented as any number of separate integrated circuits or separate devices interconnected with each other in a suitable manner. For example the processing units, memory controller and the memory location comprising global variables are located on different dies or in different devices.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for detecting a race condition, comprising
    storing, in a first memory location shared by two or more threads, a seed value to a first global variable;
    identifying the race condition in a first instance when a second global variable, stored in a second memory location shared by the two or more threads, does not equal a first predefined value, wherein the second global variable was set to the first predefined value at an initiation event prior to storing the seed value;
    in response to not identifying the first race condition in the first instance, storing a second predefined value to the second global variable;
    in further response to not identifying the race condition in the first instance, identifying the race condition in a second instance when the first global variable does not equal the seed value;
    in response to not identifying the race condition in the second instance, accessing a shared resource; and
    in further response to not identifying the race condition in the second instance, storing the first predefined value to the second global variable.

2. The method as claimed in claim 1, further comprising:
    generating a race detected message in response to identifying the race condition in the first instance or in the second instance.

3. The method as claimed in claim 1, wherein the seed value is provided by a calling thread.

4. A device configured to detect a race condition between threads executing on the device, the device comprising:
    a memory, shared by one or more threads, configured to store a seed value to a first global variable;
    a shared resource, wherein the shared resource is configured to be shared by the one or more threads;
    first and second processors, coupled to the memory and the shared resource, configured to
        execute the one or more threads,
        identify the race condition in a first instance when a second global variable, stored in the memory, does not equal a first predefined value, wherein the second global variable was set to the first predefined value at an initiation event prior to storing the seed value,
        in response to not identifying the race condition in the first instance, store, in the memory, a second predefined value to the second global variable,
        in further response to not identifying the race condition in the first instance, identify the race condition in a second instance when the first global variable does not equal the seed value,
        in response to not identifying the race condition in the second instance, access the shared resource, and
        in further response to not identifying the race condition in the second instance, store the first predefined value to the second global variable.

5. The device as claimed in claim 4, wherein the first and second processors are further arranged to, generate a race detected message in response to identifying the race condition in the first instance or in the second instance.

6. The device as claimed in claim 4, wherein a processor of the one or more processors is further arranged to receive the seed value by a calling thread.

7. A non-transitory computer-readable storage medium storing instructions executable by a plurality of processors of a processing unit, the instructions for performing a method, the method comprising:
    storing, in a first memory location shared by two or more threads, a seed value to a first global variable;
    identifying a race condition in a first instance when a second global variable, stored in a second memory location shared by the two or more threads, does not equal a first predefined value, wherein the second global variable was set to the first predefined value at an initiation event prior to storing the seed value;
    in response to not identifying the race condition in the first instance, storing a second predefined value to the second global variable;

in further response to not identifying the race condition in the instance, identifying the race condition in a second instance when the first global variable does not equal the seed value;

in response to not identifying the race condition in the second instance, accessing a shared resource associated with the processing unit; and in further response to not identifying the race condition in the second instance, storing the first predefined value to the second global variable.

8. The computer-readable storage medium of claim 7, the method further comprising:

generating a race detected message in response to identifying the race condition in the first instance or in the second instance.

9. The computer-readable storage medium of claim 7, wherein the seed value is provided by a calling thread.

10. The computer-readable storage medium of claim 7, wherein the method is executable by each of the two or more threads when accessing the shared resource.

11. The method as claimed in claim 1, further comprising:

terminating a thread in response to identifying the race condition in the first instance or in the second instance.

12. The device as claimed in claim 4, wherein the first and second processors are further arranged to terminate operation in response to identifying the race condition in the first instance or in the second instance.

13. The computer-readable storage medium of claim 7, the method further comprising:

terminating a thread in response to identifying the race condition.

* * * * *